(12) United States Patent
King et al.

(10) Patent No.: US 9,856,018 B2
(45) Date of Patent: Jan. 2, 2018

(54) DUCTED FAN DOORS FOR AIRCRAFT

(71) Applicant: The Boeing Company, Chicago, IL (US)

(72) Inventors: Carl King, Apache Junction, AZ (US); Glenn Thomas Pyle, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 338 days.

(21) Appl. No.: 14/992,283

(22) Filed: Jan. 11, 2016

(65) Prior Publication Data

US 2017/0197711 A1 Jul. 13, 2017

(51) Int. Cl.
*B64C 29/00* (2006.01)

(52) U.S. Cl.
CPC .................. *B64C 29/0025* (2013.01)

(58) Field of Classification Search
CPC ............ B64C 29/0025; B64C 29/0066; B64C 23/005; B64C 15/02; B64D 33/04
See application file for complete search history.

(56) References Cited

U.S. PATENT DOCUMENTS

| | | | |
|---|---|---|---|
| 3,116,898 A | | 1/1964 | Clark et al. |
| 3,171,613 A | | 3/1965 | James |
| 3,220,669 A | * | 11/1965 | Lewis ................. B64C 29/0025 244/12.3 |
| 3,333,793 A | * | 8/1967 | Opfer, Jr. ............ B64C 29/0025 239/265.27 |
| 3,730,456 A | * | 5/1973 | Morgan ................ B64C 29/005 244/12.3 |
| 3,802,125 A | * | 4/1974 | Baker ................... B64C 1/1438 49/215 |
| 4,823,547 A | * | 4/1989 | Newton .................... F02K 1/72 239/265.31 |
| 4,828,203 A | * | 5/1989 | Clifton ................ B64C 29/0033 244/12.3 |
| 5,115,996 A | * | 5/1992 | Moller ................ B64C 29/0025 239/265.19 |
| 5,407,150 A | * | 4/1995 | Sadleir ................ B64C 29/0025 244/12.4 |
| 5,507,453 A | * | 4/1996 | Shapery .............. B64C 29/0025 244/12.2 |
| 5,746,390 A | * | 5/1998 | Chiappetta .............. B64C 37/00 244/12.2 |

(Continued)

Primary Examiner — Medhat Badawi
(74) Attorney, Agent, or Firm — Hanley, Flight & Zimmerman, LLC

(57) ABSTRACT

Example doors for ducted fan inlet openings are disclosed herein. An example apparatus disclosed herein includes a door and a duct of a ducted fan unit extending through a body of an aircraft. The duct of the example apparatus defines a passageway between a first opening in a first side of the body and a second opening in a second side of the body opposite the first side. The example apparatus also includes an actuation system to move the door between a first position in which the door is disposed over the first opening and a second position in which the door is disposed over the first side of the body and outside of a diameter of the first opening. In the example apparatus, the door is orientated generally parallel to the first side of the body throughout movement of the door between the first position and the second position.

17 Claims, 8 Drawing Sheets

(56) References Cited

U.S. PATENT DOCUMENTS

| | | | |
|---|---|---|---|
| 6,561,456 B1* | 5/2003 | Devine | B64C 29/0025 244/12.1 |
| 8,020,804 B2 | 9/2011 | Yoeli | |
| 8,181,903 B2* | 5/2012 | Posva | B64C 15/14 244/12.3 |
| 9,676,479 B2* | 6/2017 | Brody | B64C 29/0033 |
| 2003/0136873 A1* | 7/2003 | Churchman | B64C 29/0025 244/10 |
| 2004/0245374 A1* | 12/2004 | Morgan | B64C 29/0025 244/12.3 |
| 2007/0057113 A1* | 3/2007 | Parks | B64C 15/00 244/12.5 |
| 2007/0246601 A1* | 10/2007 | Layton | B64C 29/0025 244/12.2 |
| 2013/0140404 A1* | 6/2013 | Parks | G05D 1/102 244/23 A |
| 2014/0238043 A1* | 8/2014 | Sokhey | F02K 1/36 60/805 |
| 2014/0339354 A1* | 11/2014 | Gaillimore | B64C 39/12 244/12.4 |
| 2016/0010590 A1* | 1/2016 | Rolt | F02K 3/06 60/805 |
| 2016/0214710 A1* | 7/2016 | Brody | B64C 29/0033 |
| 2016/0368600 A1* | 12/2016 | Frolov | G08G 5/0021 |
| 2017/0129604 A1* | 5/2017 | Gaillimore | B64C 39/12 |
| 2017/0158321 A1* | 6/2017 | Mia | B64C 29/005 |

\* cited by examiner

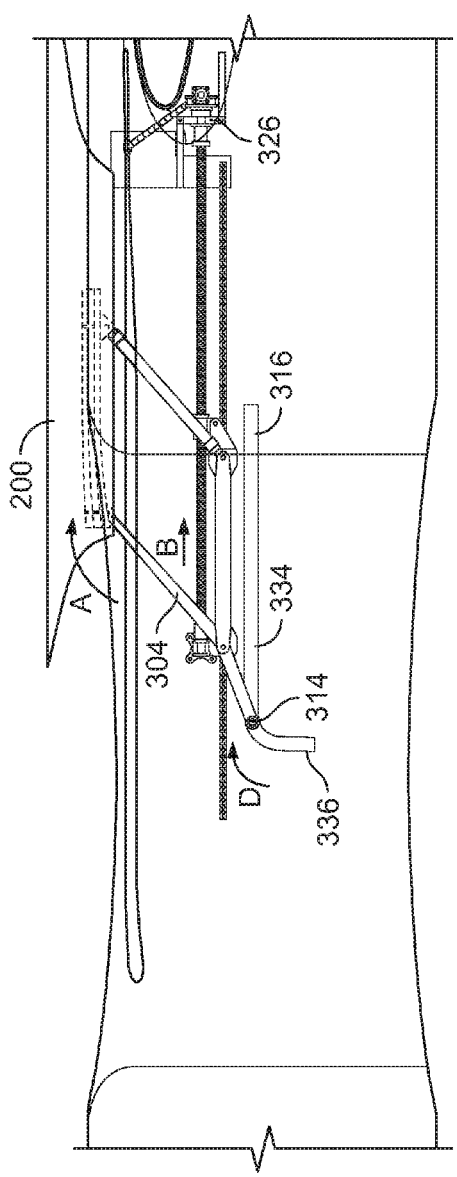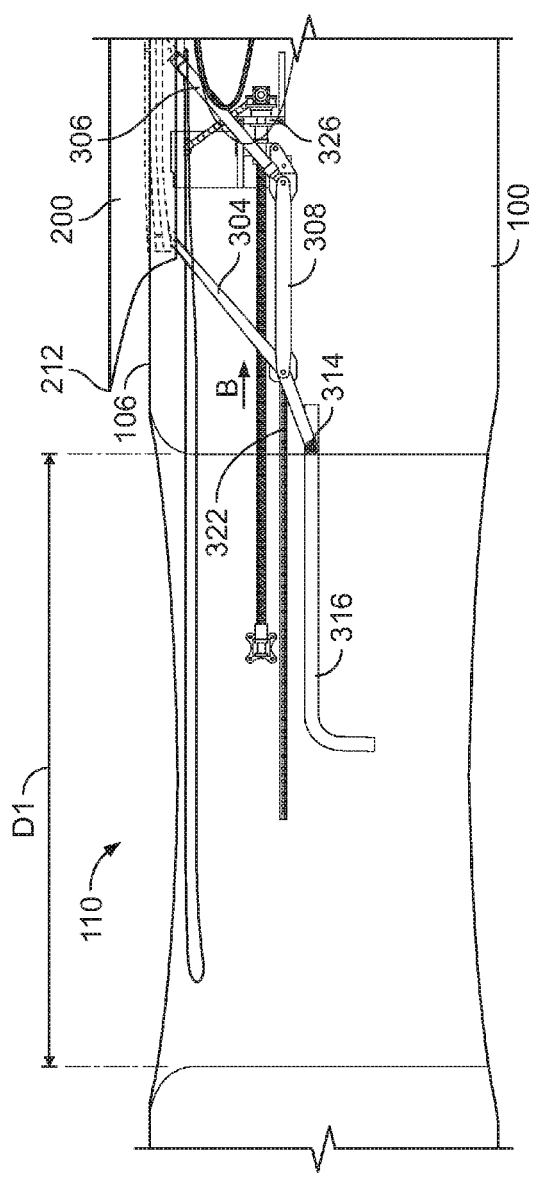

US 9,856,018 B2

DUCTED FAN DOORS FOR AIRCRAFT

GOVERNMENT LICENSE RIGHTS

This disclosure was made with Government support under Contract No. HR0011-14-9-0002 awarded by the Defense Advanced Research Projects Agency. The Government of the United States may have certain rights in this disclosure.

FIELD OF THE DISCLOSURE

This disclosure relates generally to aircraft and, more particularly, to ducted fan doors for aircraft.

BACKGROUND

Vertical takeoff and landing (VTOL) aircraft employ ducted fan units or powered rotors (e.g., tiltrotors) that generate vertical lift for hovering the aircraft during takeoff and landing. A ducted fan unit includes a ducted fan or propeller disposed within a duct or shroud formed in a body of the aircraft. The fan draws air into an inlet opening of the duct and propels the air at a high speed out of an outlet opening of the duct, which is typically facing downward toward the ground. The vertical thrust generated by the ducted fan unit lifts the aircraft from the ground. Once hovering, the aircraft may employ one or more propulsion generators (e.g., engines) to produce forward thrust.

SUMMARY

An example apparatus disclosed herein includes a door and a duct of a ducted fan unit extending through a body of an aircraft. The duct of the example apparatus defines a passageway between a first opening in a first side of the body and a second opening in a second side of the body opposite the first side. The example apparatus also includes an actuation system to move the door between a first position in which the door is disposed over the first opening and a second position in which the door is disposed over the first side of the body and outside of a diameter of the first opening. In the example apparatus, the door is orientated generally parallel to the first side of the body throughout movement of the door between the first position and the second position.

An example method disclosed herein includes moving a door of a ducted fan inlet opening on an aircraft between a closed position in which the door is disposed over the inlet opening and a retracted position in which the door is disposed over a body of the aircraft and outside of a diameter of the inlet opening. In the example method, the door remains in a generally horizontal orientation throughout the movement between the closed position and the retracted position.

An example aircraft disclosed herein includes an inlet opening of a ducted fan formed in a surface of the aircraft, a door having a diameter being the same as or larger than a diameter of the inlet opening and an actuation system to move the door between a first position in which the door is disposed over the inlet opening and a second position in which the door is disposed over the surface of the aircraft and outside of a diameter of the inlet opening. The door of the example aircraft is oriented substantially perpendicular to an axis of the inlet opening in the first position and the second position.

BRIEF DESCRIPTION OF THE DRAWINGS

In FIG. 3A, the example body is shown as transparent to expose an example actuation system for moving the example door.

In FIG. 3B, the example body is shown as transparent to expose the example actuation system.

FIGS. 5A-5D illustrate an example sequence of moving the example door of FIG. 2A from the closed position to the retracted position.

Figure 1:
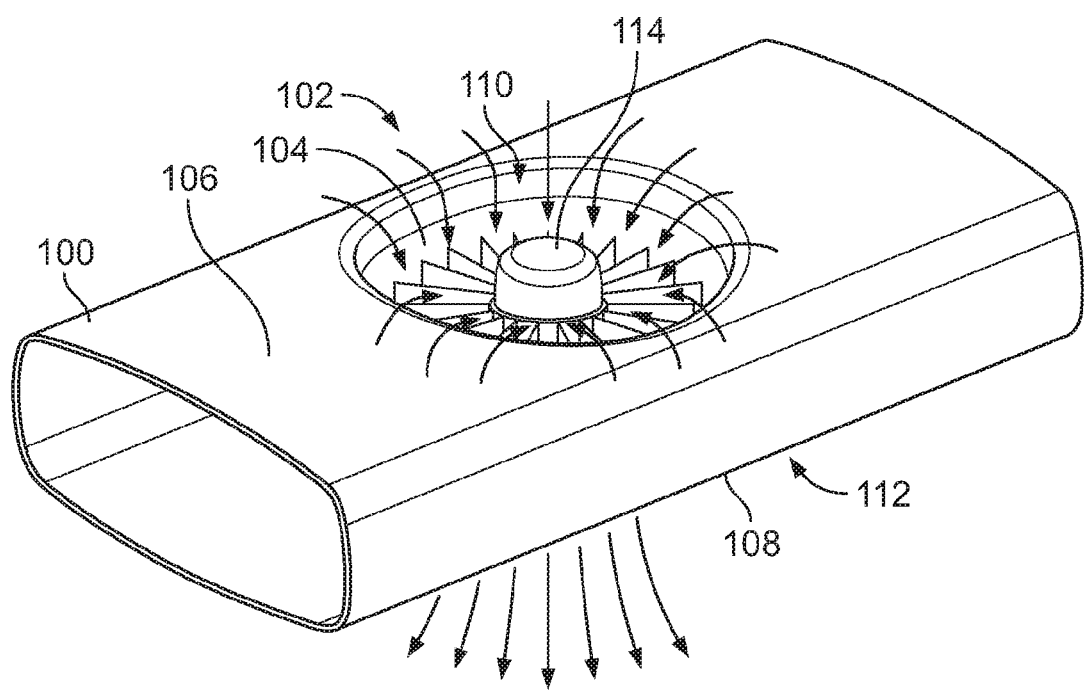
FIG. 1 illustrates an example aircraft body in which the example methods and apparatus may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Known vertical takeoff and landing (VTOL) aircraft and/or short takeoff and landing (STOL) aircraft may employ one or more ducted fans to generate vertical thrust for lifting the aircraft during takeoff and/or landing. Unlike helicopters or open rotary wing aircraft, a ducted fan unit includes a ducted fan or propeller disposed within a duct or shroud in a body, such as the fuselage, of the aircraft. The fan draws air into an inlet opening on one side of the duct and forces the air out of an outlet opening at the opposite side of the duct. In most instances, the duct is orientated along a vertical axis so that the outlet airflow is directed towards the ground and, thus, produces vertical lift. Some known VTOL and/or STOL aircraft do not include a door or cover for the inlet opening of the duct. However, when the aircraft is flying (e.g., moving in a horizontal direction), even at relatively slow speeds, the inlet opening significantly disrupts the flow of air over the aircraft, thereby creating drag and, thus, decreasing the efficiency of the aircraft. As a result, these known aircraft are only capable of relatively slow speeds.

Other known VTOL and/or STOL aircraft employ doors or covers that move between an open position to allow airflow into the inlet opening and a closed position to close off the inlet opening. In some of these known aircraft, the door rotates about a hinge between the closed position and the open position. However, in the open position, the door is orientated substantially vertical. In such a position, the door obstructs the flow of air into the inlet opening and, thus, decreases the efficiency of the ducted fan unit. Further, the door must remain in the open position while aircraft increases horizontal speed. As a result, the door causes significant drag on the aircraft.

Other known VTOL and/or STOL aircraft have a plurality of rotating vanes disposed in the inlet opening of the ducted fan unit. The vanes rotate between an open position and a closed position. However, in the open position, the vanes are disposed within the inlet airflow path. Even in the open position, the vanes still obstruct the flow of air into the inlet opening and, thus, decrease the efficiency of the ducted fan unit.

Disclosed herein are example methods and apparatus for opening or exposing an inlet opening of a ducted fan unit and for closing or sealing the inlet opening of the ducted fan unit. The examples disclosed herein employ a retractable door that is movable between a retracted or open position, which provides relatively uninterrupted airflow into the inlet opening, and a sealed or closed position, in which the door substantially seals or covers the inlet opening. In general, the example door has a diameter that is substantially the same as or larger than the inlet opening. In the closed position, the door is disposed over the inlet opening to seal the duct, and in the retracted position, the door is disposed outside of a diameter of the inlet opening to provide relatively uninterrupted airflow into the inlet opening. The example door enables an aircraft to operate between a hover or low-speed flight configuration and a high-speed flight configuration. In the hover or low-speed flight configuration, the example door may be moved to the retracted position, which enables efficient use of the ducted fan unit while substantially reducing drag, and in the high-speed flight configuration, the door may be moved to closed position, which minimizes drag that otherwise be caused by the inlet opening of the ducted fan unit.

In some disclosed examples, the door is shaped to match (e.g., conform to) the profile or contour(s) of the outer skin of the aircraft adjacent the inlet opening. In some examples, a recess is formed around the inlet opening for receiving the door. Therefore, when in the closed position, the door is substantially flush or even with the outer skin of the aircraft. The example door minimizes drag on the aircraft that would otherwise be caused by an exposed inlet opening and, thus, increases the aerodynamic performance of the aircraft. As a result, the aircraft may achieve relatively higher speeds with the example door. In the retracted position, the example door remains relatively close to or proximate the body of the aircraft and is clear of the inlet opening, thereby providing free, uninterrupted airflow into the inlet opening.

Disclosed herein are example actuation systems for moving the example door between the retracted position and the closed position. In some disclosed examples, the door remains in substantially the same orientation while the door is moved between the closed and retracted positions. In particular, the example door remains orientated substantially perpendicular to an axis of the duct (e.g., a vertical axis) and/or substantially parallel to a surface of the body in which the inlet opening is formed. In some examples, when moving the door from the closed position to the retracted position, the door is moved (e.g., lifted) away from the inlet opening along an arcuate path and then is translated along a substantially linear path or direction along the body of the aircraft until the door is clear of the inlet opening. Therefore, the example door remains relatively close to the body of the aircraft and, thus, results in significantly less drag on the aircraft than known inlet opening doors.

FIG. 1 illustrates an example aircraft body 100 in which the examples disclosed herein may be implemented. The aircraft body 100 may be part of a VTOL and/or an STOL vehicle, which may be, for example, a manned or unmanned aerial vehicle. The example aircraft body 100 may be a fuselage, a wing, an empennage, a canard and/or any other body structure of an aircraft. To produce vertical lift, the aircraft body 100 includes a powered rotor or ducted fan unit 102 (e.g., a propulsion unit, a thrust generator, etc.). In some examples, the aircraft body 100 may employ multiple ducted fan units that may be the same or different sizes.

In the illustrated example, the ducted fan unit 102 includes a duct 104 (e.g., a shroud, a bore, etc.) that extends through the body 100 (e.g., a fuselage) from a top side 106 (e.g., a first side) of the body 100 to a bottom side 108 (e.g., a second side) of the body 100. In particular, the duct 104 forms a passageway between an inlet opening 110 (e.g., a first opening, an aperture, a void, a ring casing, etc.) on the top side 106 of the body 100 and an outlet opening 112 (e.g., a second opening, an outlet aperture) on the bottom side 108 of the body 100 opposite the top side 106. The ducted fan unit 102 includes a fan 114 (e.g., a propeller, a rotor, etc.) disposed in the duct 104. In the illustrated example, the duct 104 is orientated substantially perpendicular to a longitudinal axis of the body 100 and, thus, is perpendicular to the ground. In operation, the fan 114 draws air into the inlet opening 110, increases the speed of the air, and forces the air through the outlet opening 112 (as shown by the airflow lines), thereby producing thrust to lift the aircraft. Therefore, during takeoff and landing, the ducted fan unit 102 may be used to produce upward thrust to move the aircraft further from or closer to the ground (e.g., to hover). Once the aircraft is at a desired altitude, the aircraft transitions into forward flight. When the aircraft is travelling an appropriate speed, the lifting surfaces of the aircraft generate enough lift to keep the aircraft in flight. As such, the ducted fan unit 102 (or multiple ducted fan units) are no longer needed and may be deactivated or turned off.

Figure 2A:
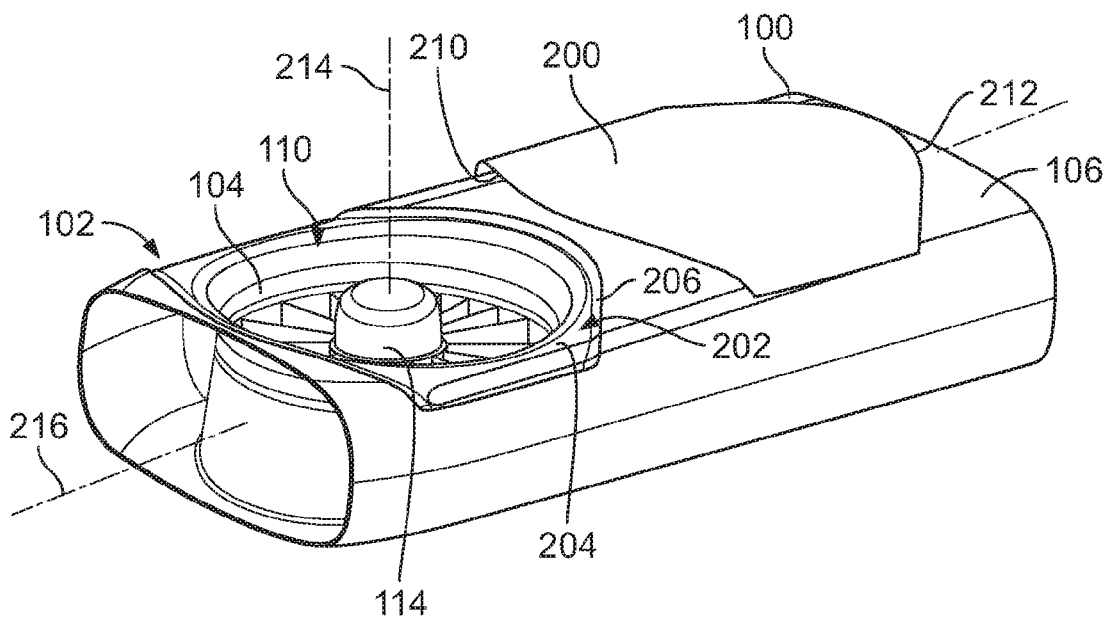
FIG. 2A illustrates an example door, constructed in accordance with the teachings of this disclosure, in a first or retracted position to allow airflow into an example inlet opening of an example ducted fan.
Figure 2B:
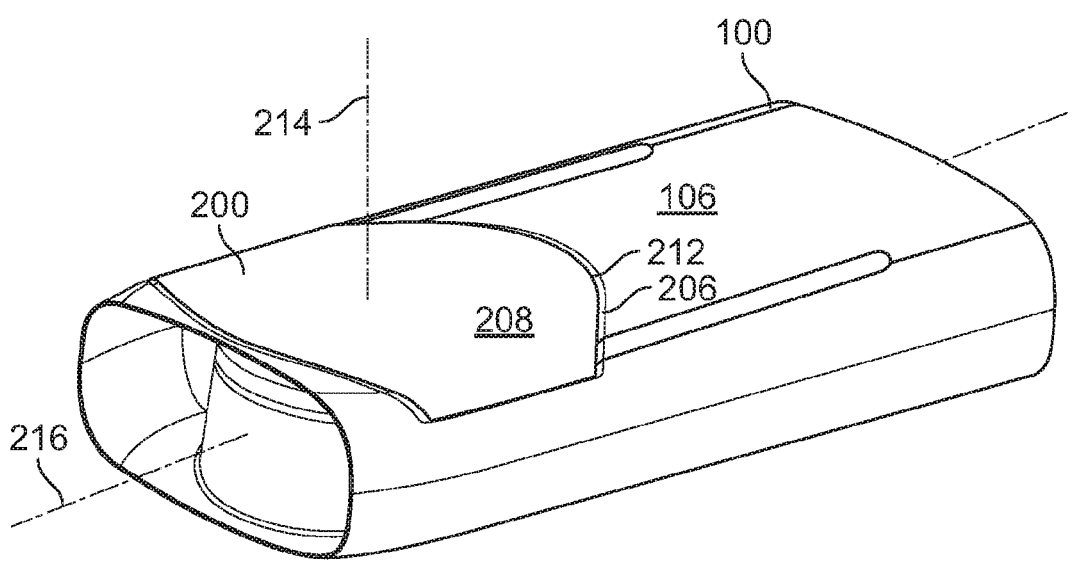
FIG. 2B illustrates the example door of FIG. 2A in a second or closed position to block or cover the example inlet opening.

Disclosed herein is an example retractable door that is movable between a retracted or open position (e.g., a first position, a stowed position) in which the door is clear of an opening (e.g., an inlet opening) of a duct and a sealed or closed position (e.g., a second position) in which the door covers or seals the opening of the duct. FIGS. 2A and 2B illustrate an example retractable door 200 (e.g., an enclosure, a cover, a lid, etc.) implemented on the ducted fan unit 102 of the example aircraft body 100 (FIG. 1). FIG. 2A shows the example door 200 in the retracted position and FIG. 2B shows the example door 200 in the closed positioned. In the retracted position, as shown in FIG. 2A, the door 200 is disposed away from or clear of the inlet opening 110, thereby exposing the fan 114. In the illustrated example, the door 200 is disposed outside of a diameter of the inlet opening 110. As a result, the door 200 creates little or no disruption of the airflow into the inlet opening 110 and, thus, maximizes the efficiency of the ducted fan unit 102. Also, in the illustrated example, the door 200 has a profile that substantially matches or corresponds to the profile or contour(s) of the body 100. Therefore, in the retracted position, the door 200 can remain relatively close to (e.g., proximate, adjacent) the top side 106 of the body 100. In some examples, the door 200 is spaced a few inches from the top side 106 of the body 100. As such, the impact to the aircraft instability during hover and/or low-speed maneuvering is significantly less than caused by known fan duct doors that use configurations resulting in high drag caused by the doors (e.g., caused by the location of the doors relative to the aircraft).

When the ducted fan unit 102 is no longer in use, such as after the aircraft is at cruise speed, the door 200 may be moved to the closed position shown in FIG. 2B. In some examples, the door 200 is moved in a substantially linear direction between the retracted position and the closed position. In the illustrated example, a recess 202 (shown in FIG. 2A) is formed in the top side 106 of the body 100 around the inlet opening 110. The recess 202 has a lower surface 204 surrounded by a wall 206 (e.g., a lip, a ledge, a seat, an edge, etc.). In the illustrated example, the recess 202 is shaped to correspond to the shape of the door 200, which is substantially the same as the profile of the outer skin of the body 100 around the inlet opening 110. As such, when the door 200 is in the closed position (as shown in FIG. 2B), the door 200 is disposed within the recess 202 and an outer or top surface 208 of the door 200 is substantially flush or even with the skin along the top side 106 of the body 100. In the closed positioned, an inner or bottom surface 210 of the door 200 faces the lower surface 204 (FIG. 2A) of the recess 202. A perimeter or outer edge 212 of the door 200 engages the wall 206 to seal the inlet opening 110. In the illustrated example, the wall 206 is tapered or angled relative to the top side 106 of the body 100 and/or the lower surface 204. In other examples, the wall 206 may be substantially perpendicular (e.g., 90°±1°) with respect to the top side 106 of the body 100 and/or the lower surface 204. In the illustrated example, the door 200 has a larger diameter than the duct 104 and/or the inlet opening 110. As such, when the door 200 is in the closed position, the door 200 covers or blocks (e.g., seals) the inlet opening 110 and prevents airflow into the inlet opening 110. In other examples, no recess may be provided, and the door 200 may be disposed over (e.g., protrude or extend from) the top side 106 of the body 100 when in the closed position. In some examples, the door 200 has a diameter that is substantially the same as a diameter of the inlet opening 110.

As illustrated in FIGS. 2A and 2B, the door 200 remains in substantially the same orientation in both the retracted position (FIG. 2A) and the closed position (FIG. 2B). In particular, the door 200 is orientated substantially perpendicular to an axis 214 of the duct 104 or the inlet opening 110 (e.g., a vertical axis) and, thus, parallel to a longitudinal axis 216 of the body 100 and/or parallel to the top side 106 of the body 100. In some examples, the door 200 is in a generally horizontal orientation (e.g., parallel to the ground) in the retracted and closed positions. An actuation system (as described in further detail herein) maintains the door 200 in substantially the same orientation (e.g., generally parallel to the longitudinal axis 216 of the body 100, generally horizontal and/or substantially perpendicular to the axis 214) as the door 200 is translated between the retracted position and the closed position. In some examples, the door 200 is arranged on the body 100 to move aft (e.g., downstream, rearward) of the inlet opening 110 to the retracted position. As a result, when the aircraft is traveling in a forward direction (e.g., at a low speed), the airflow over the body 100 and into the inlet opening 110 is relatively unaffected by the door 200. In other examples, the door 200 may instead be translated in another other direction (e.g., fore, laterally) to another location adjacent the inlet opening 110. In the illustrated example, the door 200 is a substantially unitary piece or structure. However, in other examples, the door 200 may be constructed of multiple pieces or structures that are coupled together.

Figure 3A:
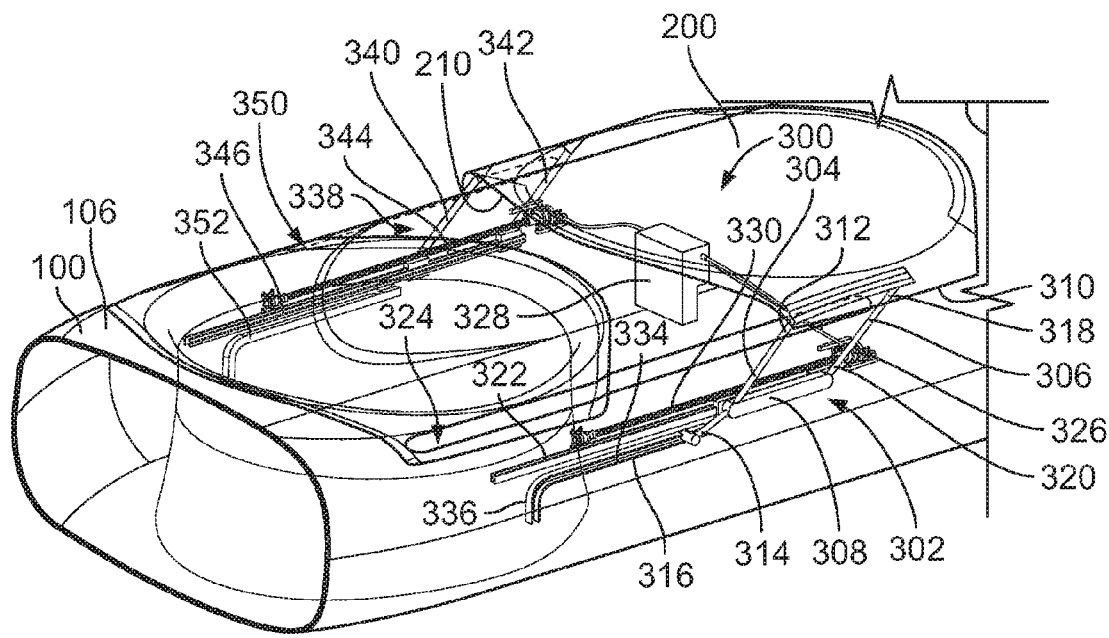
FIG. 3A illustrates another example of the example door of FIG. 2A in the retracted position.
Figure 3B:
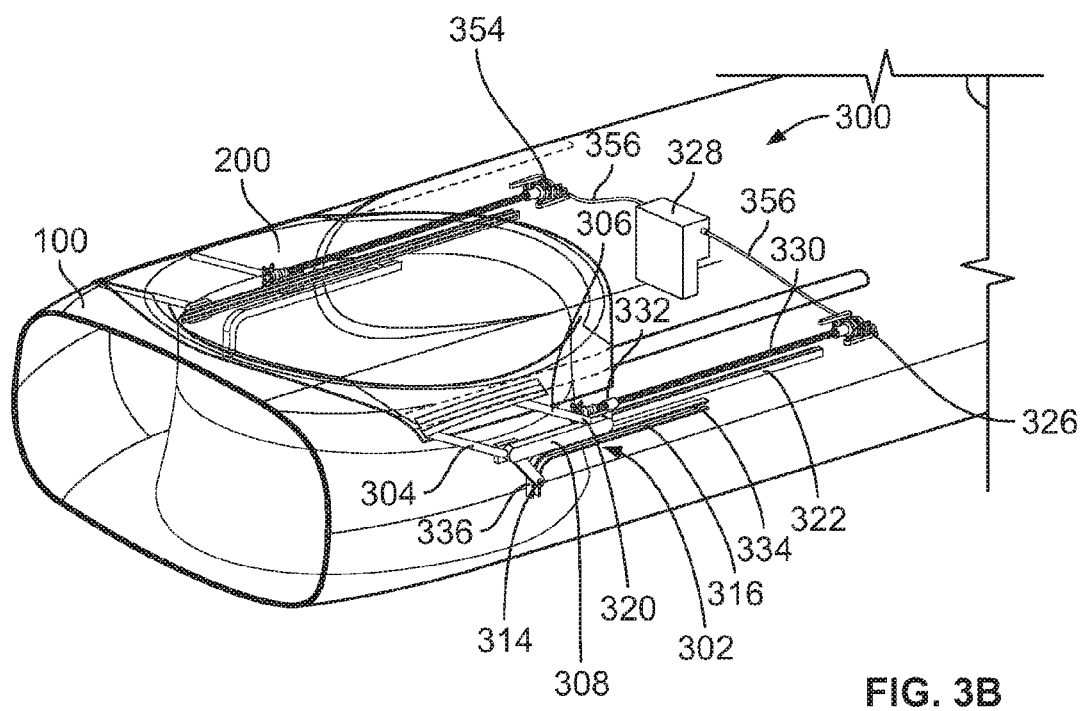
FIG. 3B illustrates the example door of FIG. 3A in the closed position.

An example actuation system 300 for moving the example door 200 between the retracted and closed positions is illustrated in FIGS. 3A and 3B. FIG. 3A shows the door 200 in the retracted position and FIG. 3B shows the door 200 in the closed position. In FIGS. 3A and 3B, the body 100 is illustrated as transparent to expose the example actuation system 300. An exploded view of the example actuation system 300 is illustrated in FIG. 4 and is described in conjunction with FIGS. 3A and 3B.

Figure 4:
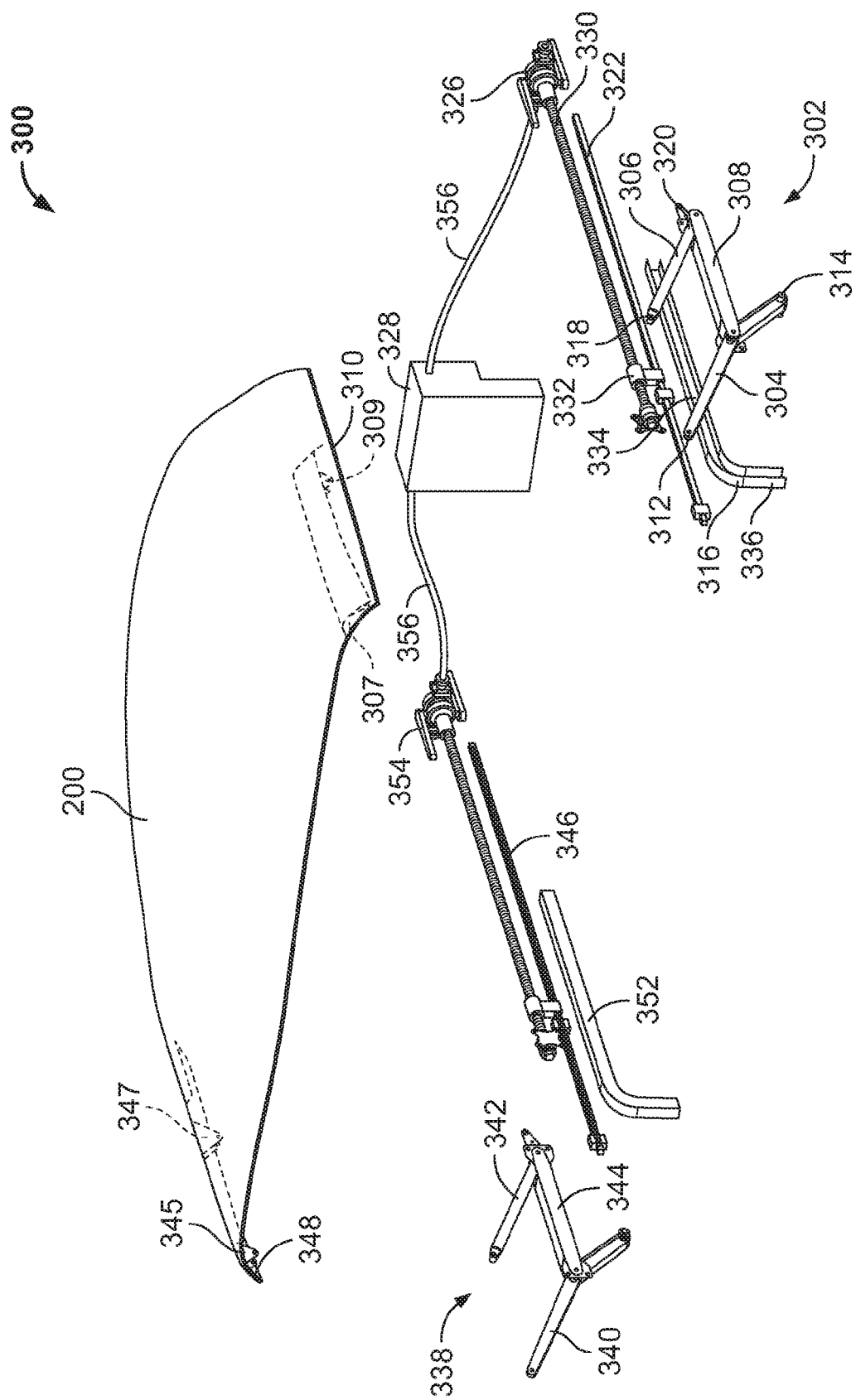
FIG. 4 is an exploded view of the example door and the example actuation system of FIGS. 3A and 3B.

As illustrated in FIGS. 3A, 3B and 4, to move the door 200, the actuation system 300 includes a first carriage assembly 302 having a first arm 304 and a second arm 306 (e.g., a first pair or set of arms) that are pivotably (e.g., rotatably) coupled to a carriage 308. The first and second arms 304, 306 are pivotably coupled to the bottom surface 210 of the door 200 via respective first and second fittings 307, 309 (FIG. 4). In the illustrated example, the first and second fittings 307, 309 are disposed at or near a first or left end 310 of the door 200. However, in other examples, the first and second arms 304, 306 may be coupled to the door 200 in other locations.

In the illustrated example, a first end 312 of the first arm 304 is coupled to the bottom surface 210 of the door 200 (via the first fitting 307 (FIG. 4)) and a second end 314 of the first arm 304, opposite the first end 312 of the first arm 304, is pivotably and slidably coupled to a first track 316. A first end 318 (e.g., a third end) of the second arm 306 is coupled to the bottom surface 210 of the door 200 (via the second fitting 309 (FIG. 4)) and a second end 320 (e.g., a fourth end) of the second arm 306, opposite the first end 318 of the second arm 306, is coupled to the carriage 308. The first and second arms 304, 306 are spaced from each other. The carriage 308 is disposed within the body 100 and is slidably coupled to and movable along a first rail 322 (e.g., a track, a guide, etc.) in a substantially linear direction or path along the first rail 322. As illustrated in FIGS. 3A and 3B, the first and second arms 304, 306 of the first carriage assembly 302 extend through a first slot 324 in the top side 106 of the body 100. In some examples, a cover and/or seal may be provided to close the first slot 324 formed in the top side 106 of the body 100 to reduce drag and enhance aircraft performance. The carriage assembly 302 translates back-and-forth along the first rail 322 to move the door 200 (via the first and second arms 304, 306) between the retracted position (shown in FIG. 3A) and the closed positioned (shown in FIG. 3B).

To move or drive the first carriage assembly 302 along the first rail 322, the example actuation system 300 includes a first actuator 326, which is powered by a power drive unit (PDU) 328. The first actuator 326 drives the carriage 308 (and, thus, the first and second arms 304, 306) along the first rail 322. In the illustrated example, the first actuator 326 is implemented as a ball screw actuator (e.g., a linear actuator), which includes a screw 330 (e.g., a threaded shaft) and a ball or nut 332 that is coupled to the screw 330. The carriage 308 is coupled to the nut 332. As the screw 330 rotates, the nut 332 translates along the length of the screw 330, which drives the carriage 308 along the first rail 322 and, thus, moves the door 200 forward and backward between the retracted and closed positions.

In the closed position shown in FIG. 3B, the door 200 sits within the recess 202 (FIG. 3A) formed in the top side 106 of the body 100. As such, when moving the door 200 from the closed position to the retracted position, for example, the door 200 is to be moved upward or away from the lower surface 204 of the recess 202. To move the door 200 closer to or further from the inlet opening 110 (FIG. 2A) (e.g., in or out of the recess 202), the example actuation system 300 includes the first track 316. In the illustrated example, the second end 314 of the first arm 304 is slidably coupled to the first track 316 (e.g., via a bearing or roller). The first track 316 has a first section 334 (e.g., a portion) that is substantially parallel to the first rail 322 and a second section 336 that is curved downward or perpendicular to the first section 334. When the first arm 304 travels along the second section 336 of the first track 316 (when the carriage 308 is driven along the first rail 322), the first arm 304 pivots or rotates about the carriage 308. This rotation causes the door 200 to move upwards or downwards (e.g., closer to or further from the lower surface 204 of the recess 202) along an arcuate path depending on the direction of travel. An example operation of this movement is disclosed in further detail in connection with FIGS. 5A-5D. In some examples, the actuation system 300 includes a second carriage assembly 338, as illustrated in FIGS. 3A and 4. The second carriage assembly 338 includes a first arm 340 and a second arm 342 (e.g., a second pair or set of arms) pivotably (e.g., rotatably) coupled to a carriage 344 that is slidably coupled to and movable along a second rail 346. The first and second arms 340, 342 of the second carriage assembly 338 are pivotably coupled to the bottom surface 210 of the door 200 via respective first and second fittings 345, 347 (FIG. 4). In the illustrated example, the first and second arms 340, 342 of the second carriage assembly 338 are coupled to the door 200 at or near a right or second end 348 of the door 200, opposite the first end 310 of the door 200. However, in other examples, the first and second arms 340, 342 of the second carriage assembly 338 may be coupled to the door 200 in other locations. In the illustrated example, the first and second arms 340, 342 of the second carriage assembly 338 extend through a second slot 350 in the top side 106 of the body 100. In some examples, a cover and/or seal may be provided to close the second 350 formed in the top side 106 of the body to reduce drag and enhance aircraft performance. The first arm 340 of the second carriage assembly 338 is slidably coupled to a second track 352 and the carriage 344 of the second carriage assembly 338 is driven by a second actuator 354. In the illustrated example, the second carriage assembly 338 operates in substantially the same manner as the first carriage assembly 302. In particular, the second carriage assembly 338 is substantially identical to the first carriage assembly 302, the second track 352 is substantially identical to the first track 316, the second rail 346 is substantially identical to the first rail 322, and the second actuator 354 is substantially identical to the first actuator 326. Thus, to avoid redundancy, the second carriage assembly 338 and the operations thereof are not separately described. Instead, the interested reader may refer to the above disclosure of the first carriage assembly 302, which may be equally applied to the second carriage assembly 338.

In the illustrated example, the first and second arms 304, 306 of the first carriage assembly 302 and the first and second arms 340, 342 of the second carriage assembly 338 form a four-bar linkage. In other examples, other types of linkages or arrangements may be implemented to move the door 200. In the illustrated example, the first and second actuators 326, 354 are powered by the PDU 328. The first and second actuators 326, 354 are coupled to the PDU 328 via flex shafts 356. In the illustrated examples, the first and second actuators 326, 354 are implemented as ball screw actuators. However, in other examples, the first and second actuators 326, 354 may be implemented as other types of linear actuators or rotary actuators (using one or more connections) to move the respective first and second carriage assemblies 302, 338. For example, the first actuator 326 may be a rotary actuator with a sprocket that drives a chain coupled to the carriage 308 to move the first carriage assembly 302 along the first rail 322. The first and second actuators 326, 354 may be any type of pneumatic, hydraulic, electromechanical, etc. actuator, and the PDU 328 may supply any corresponding pressurized fluid or gas, electricity, etc. to the first and second actuators 326, 354. In some examples, one actuator (e.g., the first actuator 326) may be used to move both the first and second carriage assemblies 302, 338. In some examples, a separate PDU may be provided for the first and second actuators 326, 354. In some examples, the first actuator 326 may be a different type of actuator than the second actuator 354.

Figure 5A:
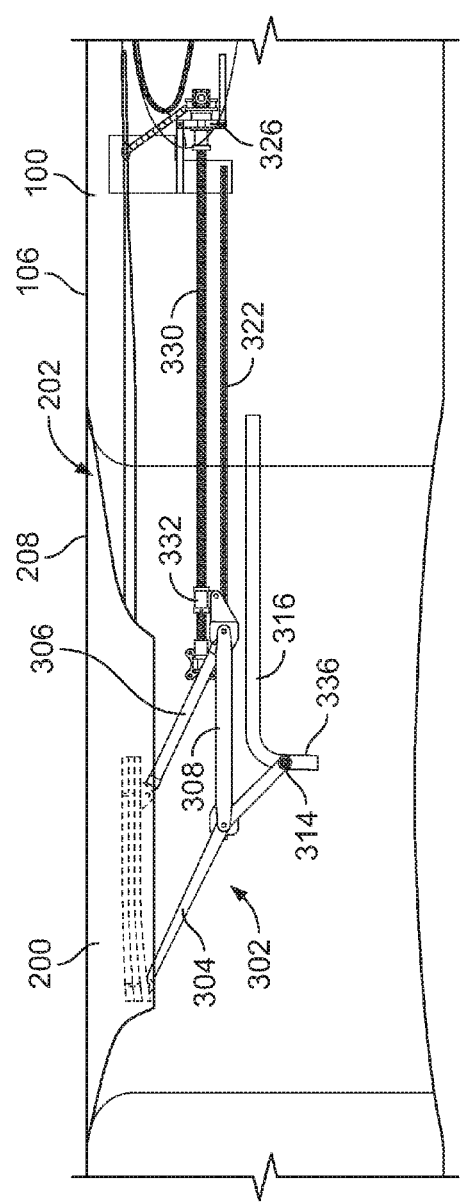

FIGS. 5A-5D show a side view of the example first carriage assembly 302 during an example operation in which the door 200 is moved from the closed position (FIG. 5A) (e.g., a first position) to the retracted position (FIG. 5D) (e.g., a second position). In the closed position, as shown in FIG. 5A, the door 200 is seated in the recess 202 (FIG. 2A). As a result, the top surface 208 of the door 200 is substantially flush with the top side 106 of the body 100 and, thus, creates minimal drag on the aircraft—(e.g., during high-speed flight). In the illustrated example, the first carriage assembly 302 is in the most forward position at the end of the first rail 322. The first and second arms 304, 306 of the first carriage assembly 302 are angled with respect to the door 200. In the illustrated example, the second end 314 of the first arm 304 is located along the second section 336 of the first track 316. In the illustrated example, the second carriage assembly 338 operates in substantially the same manner as the first carriage assembly 302. In particular, the second carriage assembly 338 is substantially identical to the first carriage assembly 302, the second track 352 is substantially identical to the first track 316, the second rail 346 is substantially identical to the first rail 322, and the second actuator 354 is substantially identical to the first actuator 326. Thus, to avoid redundancy, the second carriage assembly 338 and the operations thereof are not separately described. Instead, the interested reader may refer to the disclosure of the first carriage assembly 302, which may be equally applied to the second carriage assembly 338

Figure 5B:
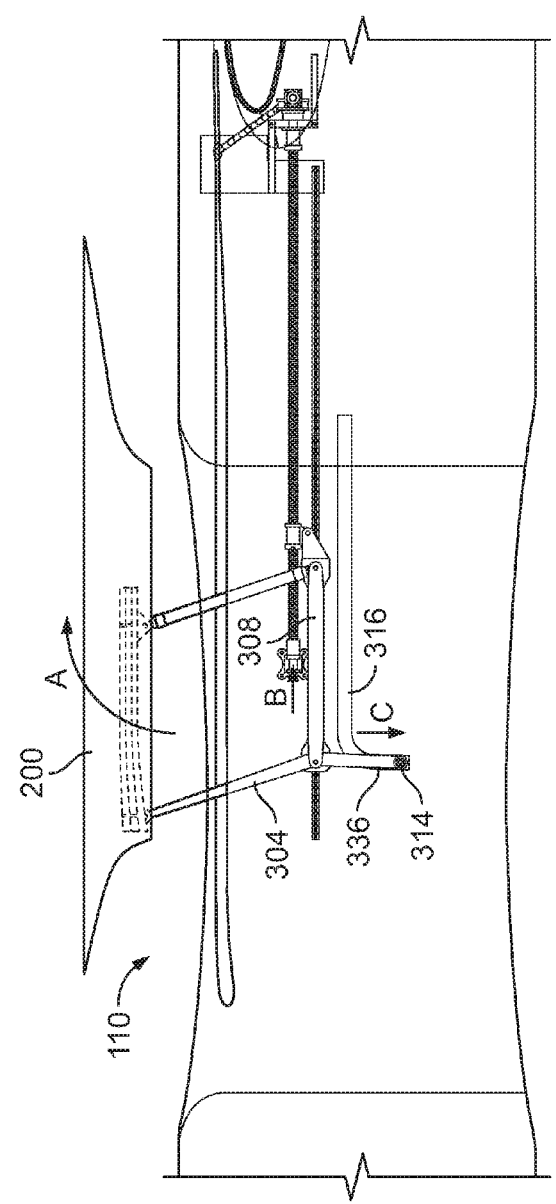

When the door 200 is to be retracted or opened, the first actuator 326 is activated (e.g., via power from the PDU 328 (FIGS. 3A, 3B and 4), which causes the screw 330 to rotate. As the screw 330 rotates, the nut 332 moves the carriage 308 rearward along the first rail 322. The first and second arms 304, 306, which are coupled to the carriage 308, are translated with the carriage 308 in the rearward direction. As shown in FIG. 5B, as the carriage 308 translates rearward, the first arm 304 rotates (in the clockwise direction as seen from FIG. 5B), thereby moving the door 200 in an arcuate path (arrow A) upward (e.g., away from the inlet opening 110) and rearward. In particular, because the second end 314 of the first arm 304 cannot move rearward (to the right in FIG. 5B), the first arm 304 rotates about the connection between the first arm 304 and the carriage 308 as the carriage 308 moves rearward (arrow B), which moves the second end 314 of the first arm 304 downward (arrow C) along the second section 336 of the first track 316 to the position shown in FIG. 5B.

As illustrated in FIG. 5C, the first actuator 326 continues to drive the carriage 308 rearward (arrow B) and the first arm 304 continues to move the door 200 along the arcuate path (arrow A). As the first arm 304 continues to rotate, the second end 314 of the first arm 304 travels upward along the second section 336 of the first track 316 and around the corner (arrow D) between the second section 336 and the first section 334 of the first track 316. In this intermediate position, the second end 314 of the first arm 304 is now able to travel rearward (e.g., in the direction of arrow B) along the first track 316.

After the second end 314 of the first arm 304 rounds the corner of the first track 316, the first arm 304 remains in substantially the same orientation and the first and second arms 304, 306 continue to translate rearward (arrow B), as illustrated in FIG. 5D. The first actuator 326 continues to drive the carriage 308 rearward (arrow B) along the first rail 322 until the door 200 is clear from the inlet opening 118. As illustrated in FIG. 5D, the door 200 is outside of a diameter D1 of the inlet opening 118 (e.g., is not disposed above the inlet opening 118). In other words, the edge 212 of the door 212 is outside of the diameter D1. Therefore, in the retracted position, the door 200 is disposed over the top side 106 of the body 100 and outside of the diameter D1 of the inlet opening 118. Between the intermediate position shown in FIG. 5C and the retracted position shown in FIG. 5D, the door 200 is translated along a substantially linear path (e.g., a illustrated by arrow B). Therefore, during a first portion of the example retraction operation, the door 200 is moved along an arcuate path (e.g., in the direction of arrow A) between the closed position (FIG. 5A) and the intermediate position (FIG. 5C) in which the door 200 is spaced above the inlet opening 110. During a second portion of the example retraction operation, the door 200 is moved along a substantially linear path (e.g., in the direction of arrow B) between the intermediate position (FIG. 5C) and the retracted position (FIG. 5D). In the illustrated example of FIGS. 5A-5D, the door 200 remains in substantially the same orientation (e.g., perpendicular to the axis 214 (FIG. 2A), horizontal and/or parallel to the longitudinal axis 216 (FIG. 2A) of the body 100) throughout the movement between the closed position and the retracted position.

As illustrated in the retracted position in FIG. 5D, the door 200 remains relatively close to the top side 106 of the body 100. In this position, the thin profile of the door 200 minimizes drag produced by the door 200 (e.g., when the aircraft is moving forward at a low speed). Once the aircraft is travelling fast enough to maintain flight (e.g., via the aerodynamic shape and/or lift surfaces of the aircraft), the door 200 may be closed. An example closing operation may be performed by reversing the operations of FIGS. 5A-5D, i.e., from the retracted position (FIG. 5D) to the closed position (FIG. 5A).

In some examples, the door 200 may be moved to a position between the retracted position and the closed position. For example, the door 200 may be maintained in the position illustrated in FIG. 5B. In such a position, the door 200 only partially blocks airflow into the inlet opening 110. Therefore, the example door 200 may be used to control the amount of airflow into the inlet opening 110 and, thus, may be used to enhance the aerodynamic control of the aircraft.

The distance the door 200 is moved above the inlet opening 110 may be increased or decreased by changing the length of the first and second arms 304, 306, the position of the carriage 308 and/or the track first 316 within the body 100, and/or the length and shape of the second section 336 of the first track 316. As disclosed above, the second carriage assembly 338 (FIGS. 3A and 4) operates in substantially the same manner as the first carriage assembly 302. To avoid redundancy, the operation of the second carriage assembly 338 is not described herein. However, it is understood that the second carriage assembly 338 may operate in an identical manner as the first carriage assembly 302 disclosed in connection with FIGS. 5A-5D.

In some examples, no recess may be formed around the inlet opening 110. In such an example, the door 200 is not raised above the inlet opening 110 before moving the door 200 linearly to the open position. For example, the door 200 may move linearly, above the top side 106 of the body 100, between the open and closed positions.

Figure 6:
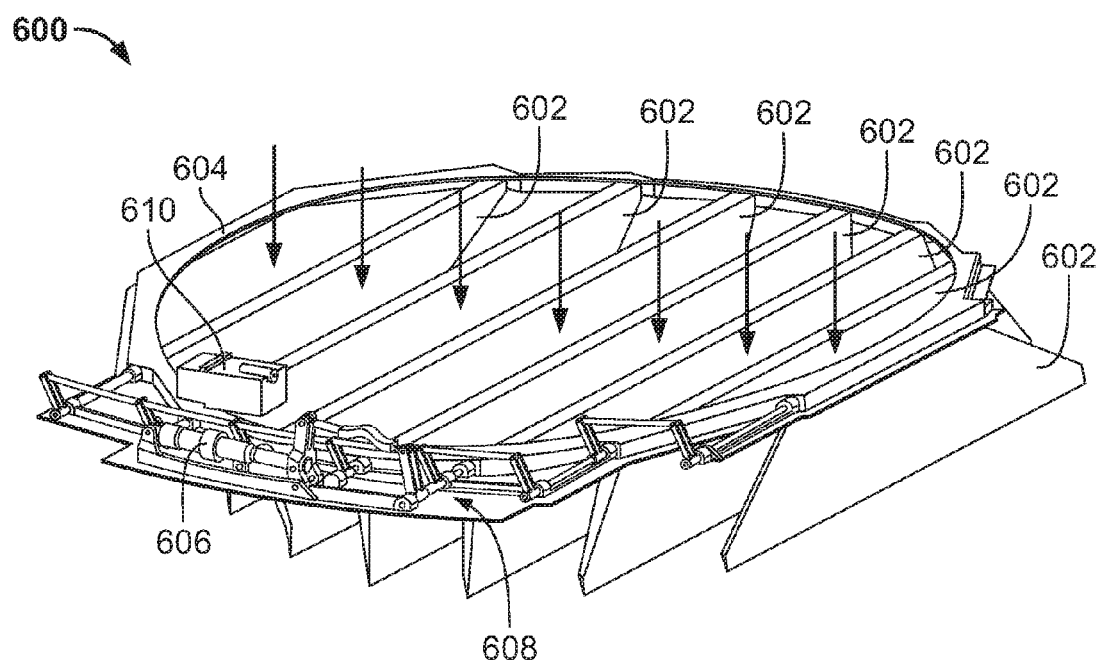
FIG. 6 illustrates an example lower cover that may be implemented on the example ducted fan of FIG. 2A.

FIG. 6 illustrates an example lower door or cover 600 that may be used on the outlet opening 112 (FIG. 1) of the ducted fan unit 102 to open and close the outlet opening 112. The example lower cover 600 includes a plurality of vanes or louvers 602 that are hingeably coupled to a mounting ring 604 at their respective ends. The mounting ring 604 may be coupled to the outlet opening 112. The louvers 602 are rotatable about respective axles between an open position, as shown in FIG. 6, and a closed position. The louvers 602 may be rotated to the open position, for example, when the ducted fan unit 102 is producing thrust, which enables outlet airflow (as shown by the arrows) to be directed between the louvers 602. In the fully open position (as shown in FIG. 6), the louvers 602 are substantially parallel to the direction of the outlet airflow. When the ducted fan unit 102 is not in use such as, for example, when the aircraft is at cruise speed, the louvers 602 may be rotated to the closed position to cover or block (e.g., seal) the outlet opening 112, which increases the efficiency of the aircraft at higher speeds. In the closed position, the louvers 602 are perpendicular to the outlet airflow and form a substantially continuous circular cover or door. To rotate the louvers 602 between the open position and the closed position (and/or any other position therebetween (e.g., a partially open position in which the louvers 702 are at 45°)), the example lower cover 600 includes an actuation system having an actuator 606 that rotates the respective louvers 602 via an in-line linkage system 608. The louvers 602 may be rotated to specific angles to provide low speed directional control during hover. In other words, the louvers 602 may be rotated to angles between the open position and the closed position to control a direction of movement of the aircraft. For example, the louvers 602 may be oriented 10° from vertical. In such an orientation, the outlet airflow is directed at least partially sideways (e.g., lateral or horizontal), thereby producing side force or thrust to move the aircraft to the side (e.g., or forward, backward, etc. depending on the direction of the louvers 602). In some examples, the louvers 602 may be rotated up to 180° (e.g., from horizontal in one direction to horizontal in the other direction). In the illustrated example, the actuator 706 is a dual tandem actuator, which includes stems that extend outward in opposite directions. In illustrated example, the actuator 606 activates all of the louvers 602. However, in other examples, multiple actuators may be provided that activate one or multiple ones of the louvers 602. In such an example, a different type of linkage system may be employed. In the illustrated example, the lower cover 600 includes a control module 610 (e.g., a PDU) that controls the actuator 606. The actuator 606 may be any type of pneumatic, hydraulic, electromechanical, etc. actuator.

In the illustrated example, six louvers 602 are implemented in the example lower cover 600. In other examples, more or fewer louvers (e.g., two louvers, eight louvers, etc.) may be implemented. In some examples, the louvers 602 are removably coupled to the mounting ring 604, which enables the louvers 602 to be installed, replaced and/or removed.

Figure 7:
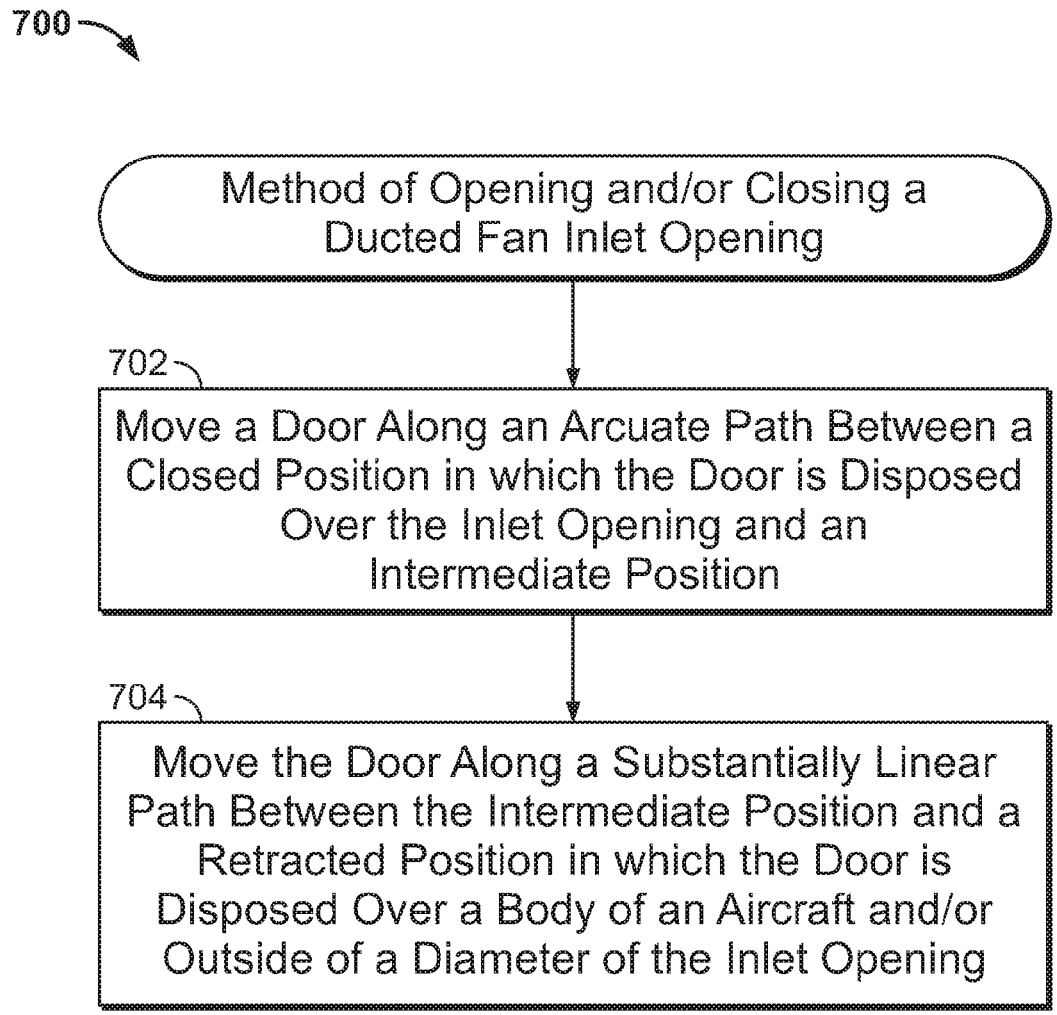
FIG. 7 is a flow chart representative of an example method of opening and/or closing an example ducted fan inlet opening.

FIG. 7 is a flow chart representative of an example method 700 for opening and/or closing an inlet opening of a ducted fan, and which may be implemented with the example door 200 of FIGS. 2A-5D. The example method 700 is disclosed in connection with FIGS. 5A-5D. At block 702, the example method 700 includes moving the door 200 along an arcuate path (e.g., arrow A in FIGS. 5B and 5C) between the closed position (FIG. 5A) and the intermediate position (FIG. 5C). When moving the door 200 from the closed position to the intermediate position, the door 200 is moved away from the inlet opening 110 (e.g., in a direction perpendicular to inlet opening 110) and rearward (e.g., in the direction of arrow B). At block 704, the example method 700 includes moving the door 200 along a substantially linear path between the intermediate position (FIG. 5C) and the retracted position (FIG. 5D). When retracting the door 200, for example, the example method 700 may be performed by implementing block 702 first and then block 704. Conversely, when closing the door 200, for example, the example method 700 may be performed by implementing block 704 first and then block 702. In some examples, the method 700 includes rotating the louvers 602 between the open position, the closed position, and any position therebetween to control a direction of movement of the aircraft.

In some examples, a closing operation and/or a retracting operation may be triggered automatically (e.g., based on the speed and/or other parameter(s) of the aircraft). Additionally or alternatively, the operations of the example door 200 may be triggered by manual input (e.g., based on a pilot command, input from a remote, etc.).

While the example doors are illustrated herein as being used with a ducted fan in a body of an aircraft, the example doors may likewise be used with ducted fans in other locations, such as on a wing of an aircraft, on a tail of an aircraft, etc. Additionally or alternatively, the example doors may be used with ducted fans that are not used for vertical takeoff and landing. In particular, in some instances a ducted fan unit may be implemented to produce forward thrust. Further, the example doors disclosed herein may be employed on other types of vehicles besides aircraft, such as underwater vehicles. In some examples, the example door may be used on the outlet opening in a similar manner as disclosed above in connection with the inlet opening.

From the foregoing, it will be appreciated that the above disclosed ducted fan doors enable an aircraft to operate more efficiently between a hover or low-speed flight configuration and a high-speed flight configuration. In the hover or low-speed flight configuration, the example doors may be moved to the retracted or open position where the doors are clear from their respective inlet openings to minimize obstruction of the inlet airflows. Further, in the retracted position, the doors (which have a profile that substantially matches that of the aircraft body) are disposed relatively close to the aircraft body, which reduces drag caused by the doors during low-speed flight, for example. Thus, the example doors produce more efficient flight at low speeds than known doors that obstruct inlet airflow and create drag. In the high-speed flight configuration, the example doors may be moved to the closed position where the doors may seal the inlet openings of the ducted fan units. In the closed position, the doors may be seated within respective recesses around their respective inlet openings, which enables the doors to be substantially flush or even with the skin of the aircraft. The example lower doors/covers with a plurality of vanes or louvers that may be rotated to provided low speed directional control. As such, the example doors increase the aerodynamic efficiency during flight and, thus, enables the aircraft to achieve relatively higher speeds than known aircraft with ducted fan units, while enhancing the aircraft's directional control capability at low speeds.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
  a door;
  a duct of a ducted fan unit extending through a body of an aircraft, the duct defining a passageway between a first opening in a first side of the body and a second opening in a second side of the body opposite the first side; and
  an actuation system including a movable carriage to move the door between a first position in which the door is disposed over the first opening and a second position in which the door is disposed over the first side of the body and outside of a diameter of the first opening, the door orientated parallel to the first side of the body throughout movement of the door between the first position and the second position, wherein the carriage is moveable along a linear path that causes the door to move along (A) an arcuate path between the first position and a lifted position separated from the first opening and (B) a linear path between the lifted position and the second position.

2. The apparatus of claim 1, wherein the body of the aircraft is a fuselage, a wing, a canard or an empennage.

3. The apparatus of claim 1, wherein, in the second position, the door is disposed aft of the first opening.

4. The apparatus of claim 1, wherein, in the first position, a top surface of the door is substantially flush with a skin on the first side of the body adjacent the first opening.

5. The apparatus of claim 1, wherein the door is a substantially unitary piece or component.

6. The apparatus of claim 1, further including a recess formed in the first side of the body around the first opening, the door disposed in the recess when in the first position.

7. The apparatus of claim 1, wherein the door is a first door and the actuation system is a first actuation system, further including:
  a second door including a plurality of louvers disposed in the second opening on the second side of the body; and
  a second actuation system to rotate the louvers between an open position, a closed position, and any position between the open position and the closed position.

8. The apparatus of claim 1, wherein a profile of the door substantially matches a profile of the first side of the body adjacent the first opening.

9. A method comprising:
  moving, via a carriage coupled to a door of a ducted fan inlet opening on an aircraft, the door between a closed position in which the door is disposed over the inlet opening and a retracted position in which the door is disposed over a body of the aircraft and outside of a diameter of the inlet opening, wherein the moving of the door between the closed position and the retracted position includes (A) moving the door along an arcuate path between the closed position and an intermediate position in which the door is spaced above the inlet opening and (B) moving the door along a substantially linear path between the intermediate position and the retracted position, and wherein the door remains in a horizontal orientation throughout the movement between the closed position and the retracted position.

10. The method of claim 9, wherein a diameter of the door is the same as or larger than a diameter of the inlet opening.

11. The method of claim 9, further including rotating a plurality of louvers disposed in a ducted fan outlet opening between an open position, a closed position, and any position between the open position and the closed position to control a direction of movement of the aircraft.

12. An aircraft comprising:
an inlet opening of a ducted fan formed in a surface of the aircraft;
a door having a diameter the same as or larger than a diameter of the inlet opening; and
an actuation system including a first arm and a second arm coupled to the door, the first arm and the second arm carried by a moveable carriage to move the door between a first position in which the door is disposed over the inlet opening and a second position in which the door is disposed over the surface of the aircraft and outside of a diameter of the inlet opening, the door oriented substantially perpendicular to a direction of an axis of the inlet opening in the first position and the second position, the carriage being moveable along a linear path, a first end of the first arm pivotably coupled to the door a second end of the first arm slidably coupled to a track, and an intermediate point on the first arm between the first end and the second end pivotably coupled to the carriage.

13. The aircraft of claim 12, wherein a third end of the second arm is pivotably coupled to the door and a fourth end of the second arm is pivotably coupled to the carriage.

14. The aircraft of claim 12, wherein a first section of the track is aligned with the direction in which the door is to move, and a second section of the track oriented perpendicular to the first section of the track, such that when the second end of the first arm slides along the second section of the track, the first arm rotates and causes the first end of the first arm and the door to move along an arcuate path.

15. The aircraft of claim 12, wherein the first and second arms extend through a slot in the surface of the aircraft.

16. The aircraft of claim 12, wherein first and second arms are a first pair of arms, the first pair of arms coupled to a first end of the door, the actuation system further including a second pair of arms coupled to a second end of the door opposite the first end of the door.

17. The aircraft of claim 12, wherein the actuation system further includes an actuator to move the carriage along the linear path.

* * * * *